Figure 1:
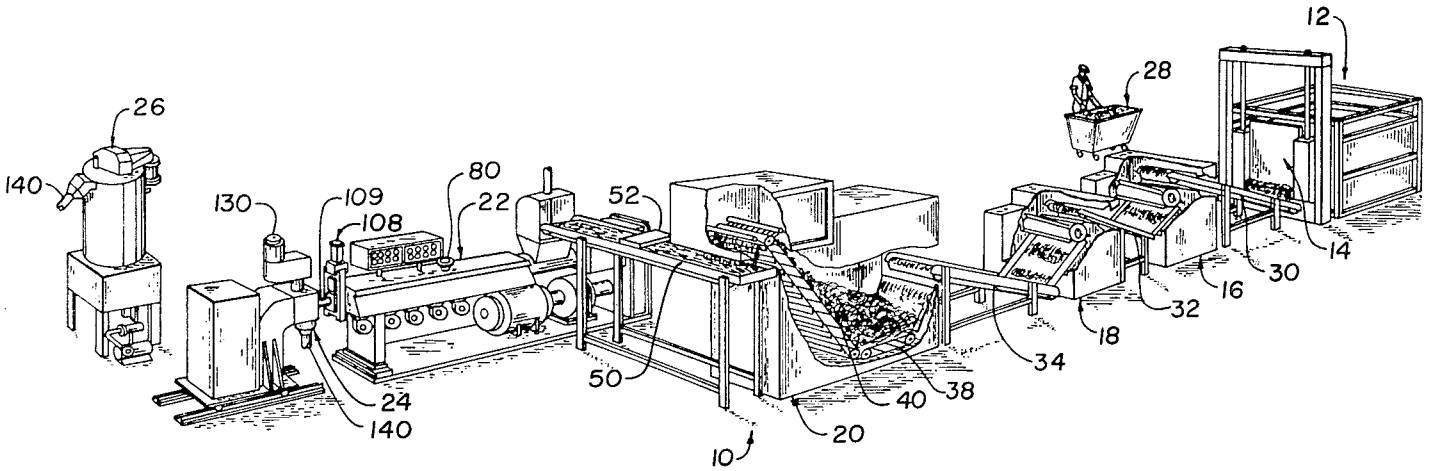
Figure 3:
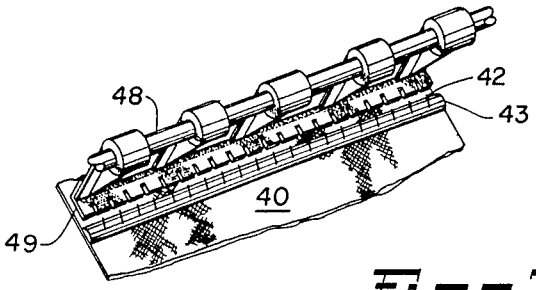
Figure 2:
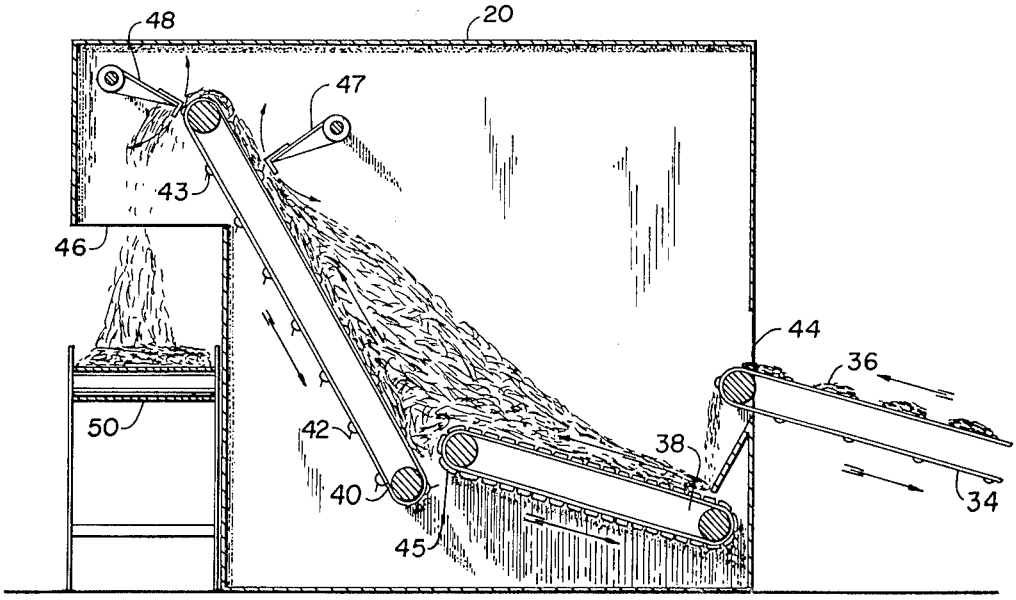
Figure 4:
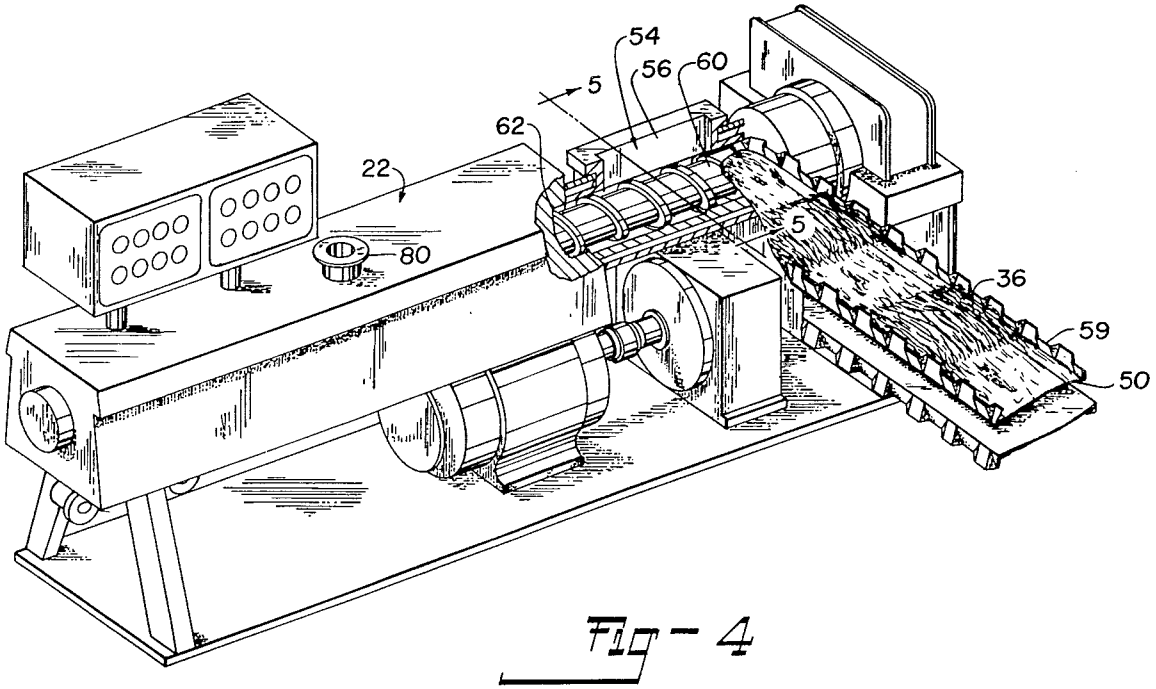
Figure 5:
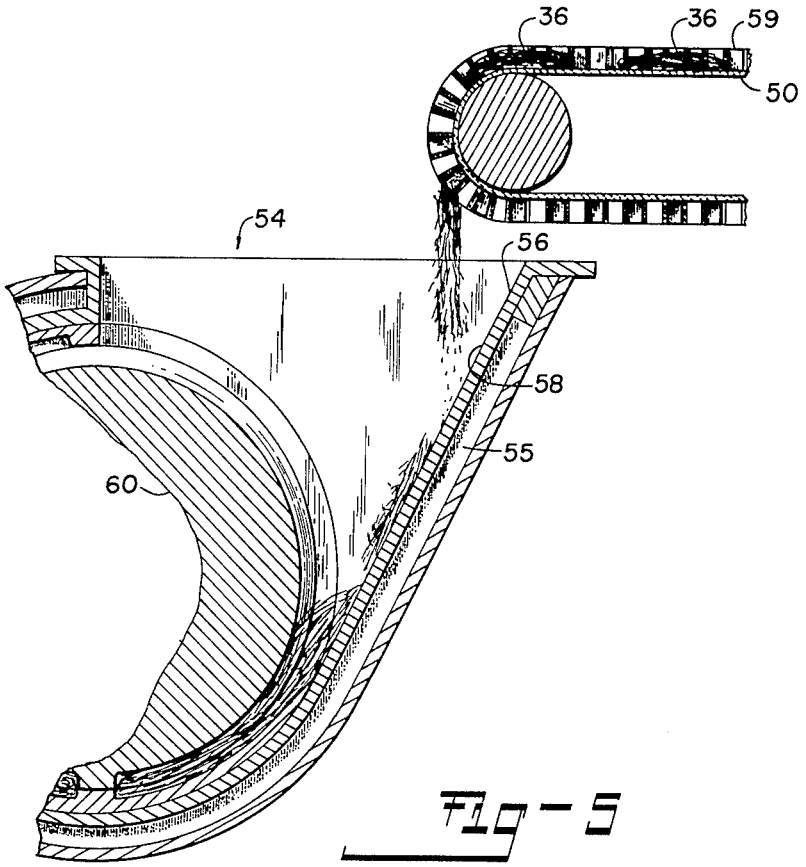
Figure 5:
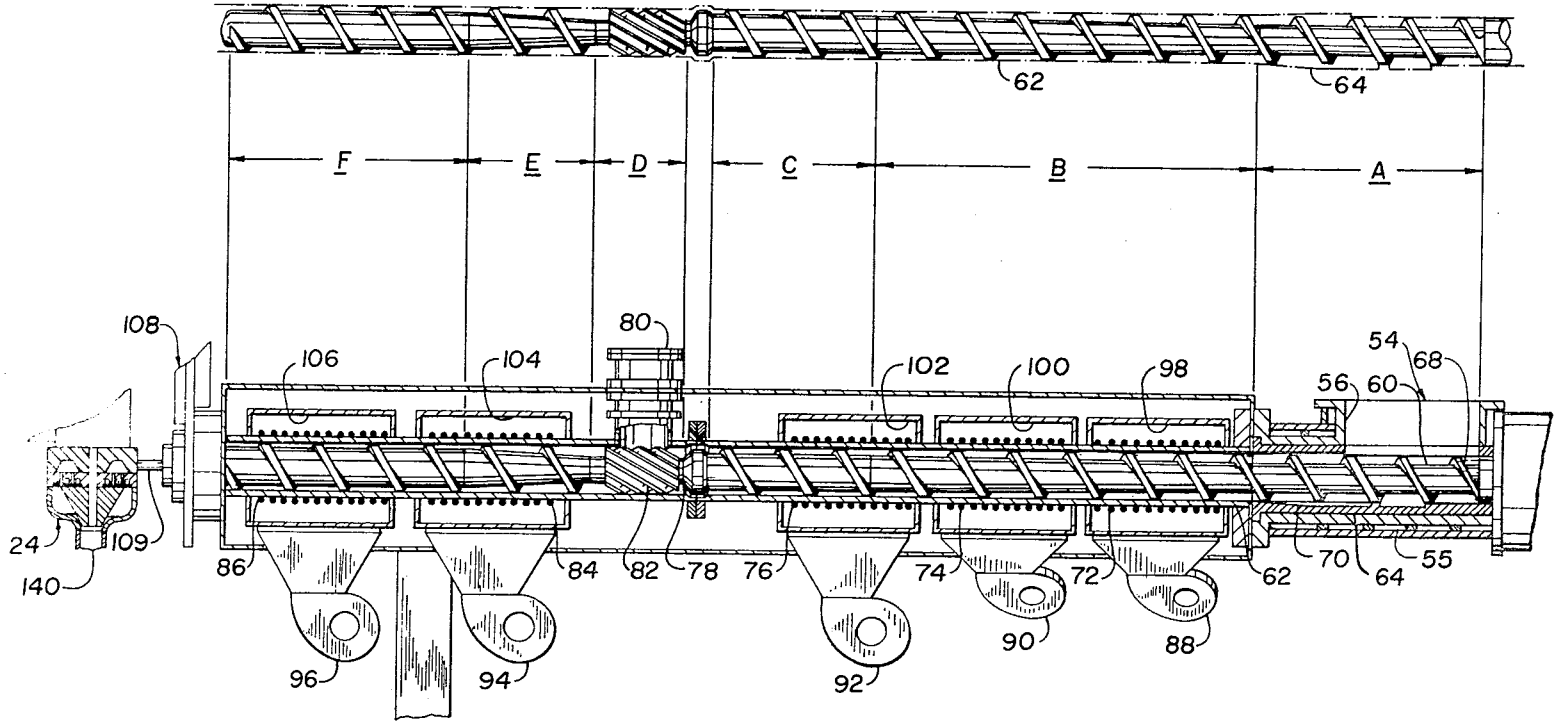
Figure 7:
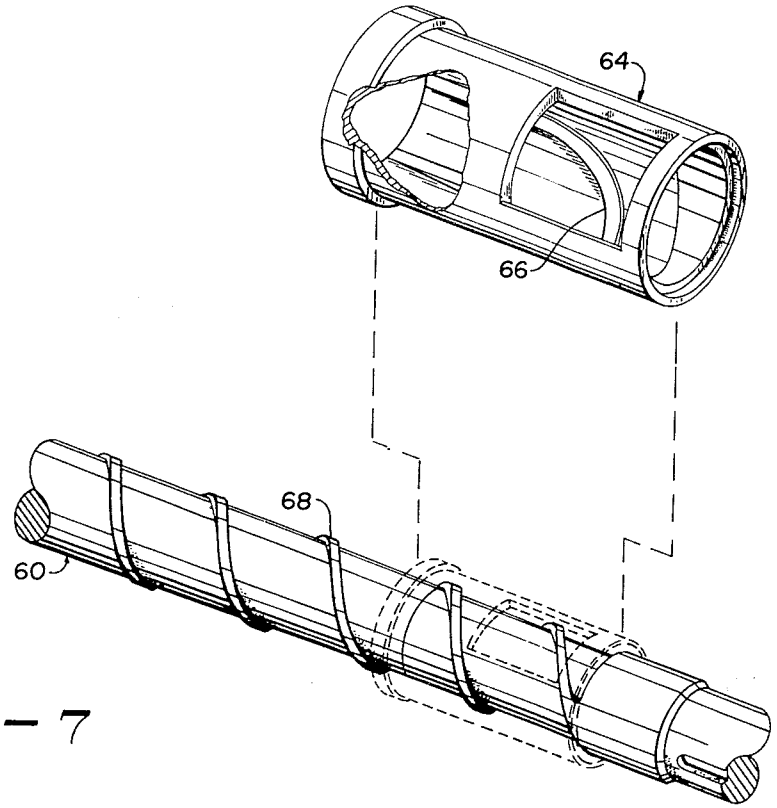
Figure 9:
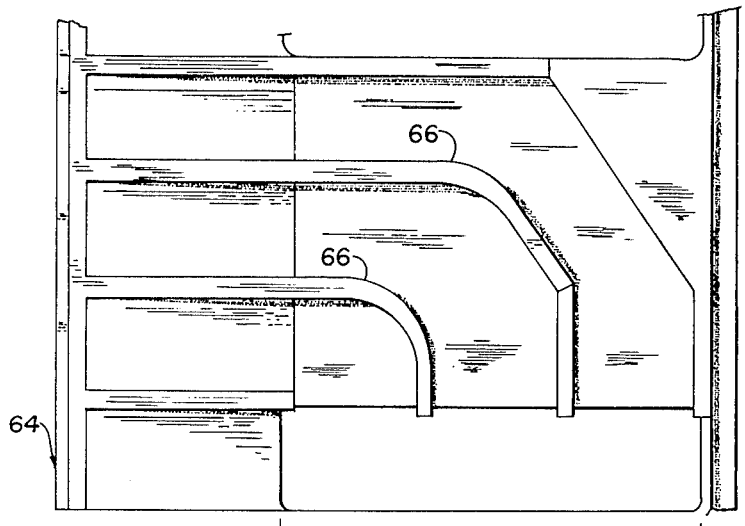
Figure 8:
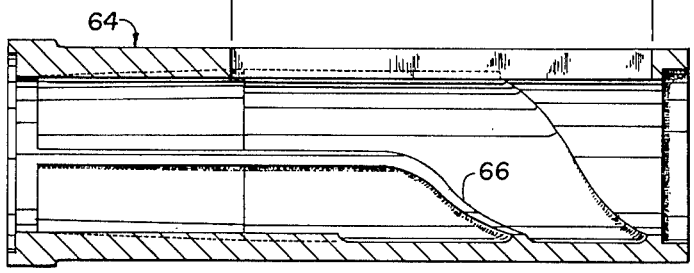
Figure 10:
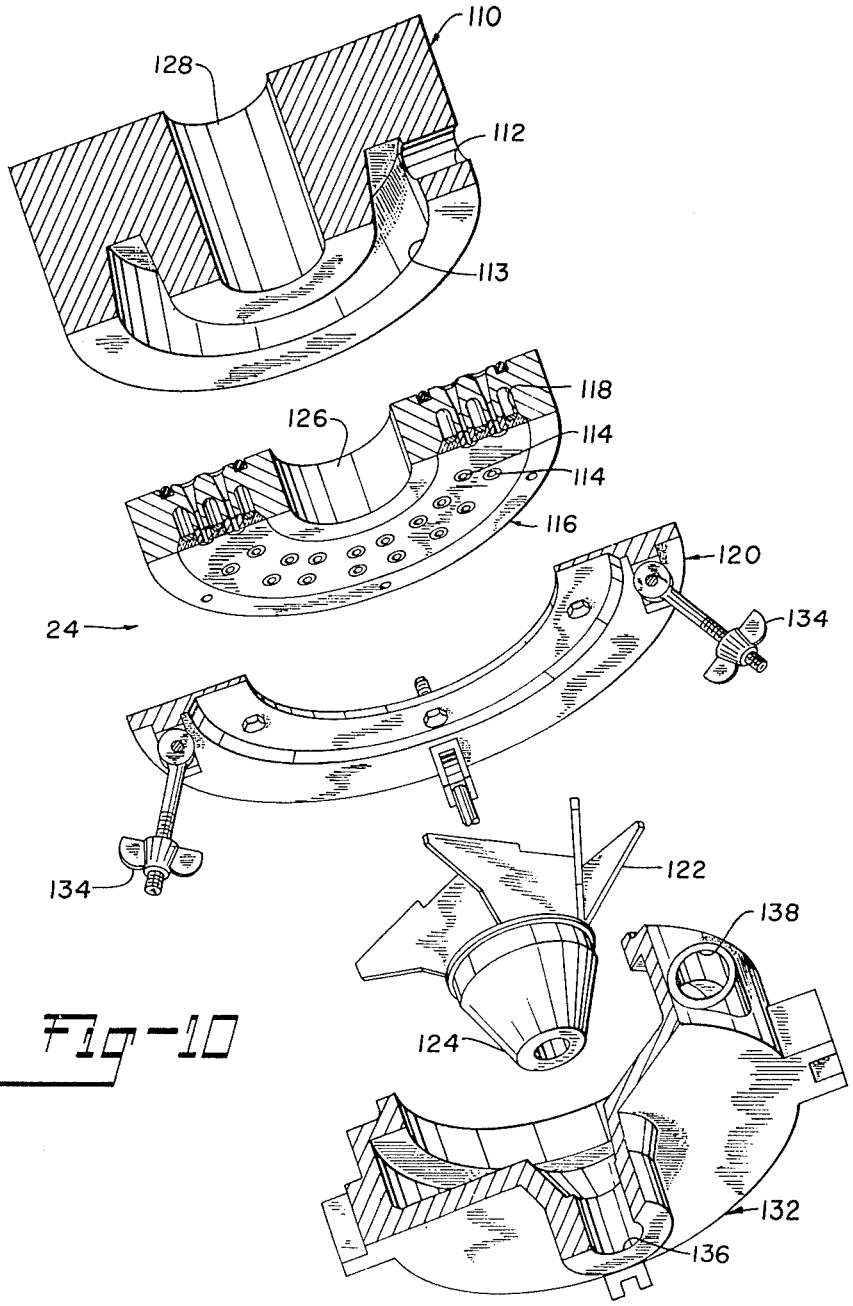

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 8

T941,016

WASTE RECOVERY OF THERMOPLASTIC CONTINUOUS FILAMENTARY MATERIAL

Robert Hester, 2100 Montrose Ave. 37664, and Howard Paul Pierson, 120 Tall Oaks Court 37663, both of Kingsport, Tenn.

Continuation of abandoned application Ser. No. 285,974, Sept. 5, 1972, which is a division of application Ser. No. 67,324, Aug. 27, 1970, now Patent No. 3,703,347. This application Oct. 15, 1974, Ser. No. 514,528

Int. Cl. B29b *1/00;* B29c *29/00;* B29f *3/00*

U.S. Cl. 264—142

8 Sheets Drawing. 20 Pages Specification

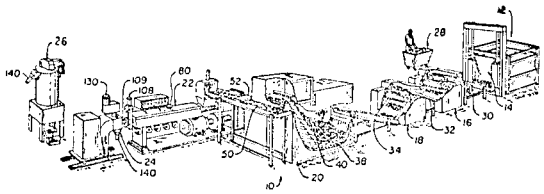

Method for recovering waste thermoplastic fiber of continuous length filamentary material and converting it into reuseable feed stock and particularly a large, otherwise unmanageable, entangled mass of continuous length filamentary material, some or all of which being either drafted or undrafted, wherein the continuous length filamentary material is converted into random length staple fiber by compressing the entangled mass of waste thermoplastic fiber into a mass of predetermined size, converting the compressed mass into staple fiber by cutting the compressed mass into predetermined sections and then cutting the sections into the staple fiber of random length, the random length staple fiber is then mechanically compacted and melted into a melt flow, and the melt flow is finally extruded as the reuseable feed stock.